United States Patent
Zhou et al.

(10) Patent No.: US 10,487,206 B2
(45) Date of Patent: Nov. 26, 2019

(54) LOW-GLOSS HEAT-RESISTANT ABS RESIN COMPOSITION AND ITS PREPARATION METHOD

(71) Applicant: SHANGHAI KUMHOSUNNY PLASTICS CO., LTD, Shanghai (CN)

(72) Inventors: Ting Zhou, Shanghai (CN); Weimei Qiu, Shanghai (CN); Minghua Luo, Shanghai (CN); Minqi Xin, Shanghai (CN)

(73) Assignee: SHANGHAI KUMHOSUNNY PLASTICS CO., LTD, Shanghai (CN)

( * ) Notice: Subject to any disclaimer, the term of this patent is extended or adjusted under 35 U.S.C. 154(b) by 217 days.

(21) Appl. No.: 15/540,496

(22) PCT Filed: Jan. 13, 2015

(86) PCT No.: PCT/CN2015/070573
§ 371 (c)(1),
(2) Date: Jun. 28, 2017

(87) PCT Pub. No.: WO2016/106836
PCT Pub. Date: Jul. 7, 2016

(65) Prior Publication Data
US 2017/0355847 A1    Dec. 14, 2017

(30) Foreign Application Priority Data
Dec. 31, 2014 (CN) .......................... 2014 1 0854343

(51) Int. Cl.
| | |
|---|---|
| *C08L 55/02* | (2006.01) |
| *B29C 48/92* | (2019.01) |
| *C08J 3/22* | (2006.01) |
| *C08K 3/36* | (2006.01) |
| *C08L 23/08* | (2006.01) |
| *C08L 25/16* | (2006.01) |
| *C08L 33/10* | (2006.01) |
| *C08L 35/06* | (2006.01) |
| *B29C 48/40* | (2019.01) |
| *B29B 9/06* | (2006.01) |
| *C08L 51/06* | (2006.01) |

(52) U.S. Cl.
CPC .............. *C08L 55/02* (2013.01); *B29C 48/92* (2019.02); *C08J 3/226* (2013.01); *C08K 3/36* (2013.01); *C08L 23/0869* (2013.01); *C08L 25/16* (2013.01); *C08L 33/10* (2013.01); *C08L 35/06* (2013.01); *B29B 9/06* (2013.01); *B29C 48/402* (2019.02); *B29C 2948/9259* (2019.02); *B29C 2948/92704* (2019.02); *C08J 2355/02* (2013.01); *C08J 2400/105* (2013.01); *C08J 2423/08* (2013.01); *C08J 2425/18* (2013.01); *C08J 2451/06* (2013.01); *C08L 51/06* (2013.01)

(58) Field of Classification Search
CPC ...... C08L 55/02; C08L 23/0869; C08L 25/16; C08L 33/10; C08L 35/06; C08L 51/06; B29C 48/92; B29C 2948/92704; B29C 2948/9259; B29C 48/402; C08J 3/226; C08J 2355/02; C08J 2400/105; C08J 2423/08; C08J 2425/18; C08J 2451/06; C08K 3/36; B29B 9/06
USPC ...................................................... 524/183
See application file for complete search history.

(56) References Cited

FOREIGN PATENT DOCUMENTS

CN    102532794 A  *  7/2012

OTHER PUBLICATIONS

CN 102532794A—machine translation (Year: 2012).*

* cited by examiner

*Primary Examiner* — Ling Siu Choi
*Assistant Examiner* — Ronald Grinsted

(57) ABSTRACT

The present invention relates to a low-gloss heat-resistant ABS resin composition and its preparation method. The low-gloss heat-resistant ABS resin composition includes following components by weight: 100 parts of acrylonitrile-butadiene-styrene (ABS) resin, 5-30 parts of heat-resistant agent, 1-5 parts of matte masterbatch D, 0.2-1.0 parts of light stabilizer, and 0.5-2.0 parts of other additives. The preparation method includes steps of: stirring and fully mixing the above-mentioned raw materials in a high-speed mixer, and then feeding the raw materials into a twin-screw extruder through a metering device; melting and compounding the materials under the conveying, shearing and mixing of the screws, and then extruding, pulling, cooling and granulating, and finally obtaining the low-gloss heat-resistant ABS resin composition. The resin composition provided by the present invention not only has excellent mechanical properties, but also has an ultra-low gloss; therefore, it is very suitable for use in the field of automotive interior parts.

9 Claims, No Drawings

LOW-GLOSS HEAT-RESISTANT ABS RESIN COMPOSITION AND ITS PREPARATION METHOD

CROSS REFERENCE OF RELATED APPLICATION

This is a U.S. National Stage under 35 U.S.C. 371 of the International Application PCT/CN2015/070573, filed Jan. 13, 2015, which claims priority under 35 U.S.C. 119(a-d) to CN 201410854343.4, filed Dec. 31, 2014.

BACKGROUND OF THE PRESENT INVENTION

Field of Invention

The present invention relates to the technical field of polymer materials, in particular to a low-gloss heat-resistant ABS resin composition and its preparation method, and more particularly to a low-gloss heat-resistant ABS resin composition which is adapted for automotive interior parts and its preparation method.

Description of Related Arts

Acrylonitrile-butadiene-styrene terpolymer (ABS) is an engineering plastic with high gloss, chemical corrosion resistance, high heat resistance, easy processing, excellent dimensional stability and other comprehensive performances. It is widely used in electronics, automobiles, household appliances, offices and other fields. To prevent sunlight reflection from generating bright light visual pollution to drivers and bringing potential safety hazards, automotive interior parts are generally subject to extinction treatment, to reduce the gloss of interior parts as much as possible. Generally speaking, there are usually two ways to reduce the gloss of interior parts; the most effective one is to change the texture of the interior surface, that is, to use the leather surface structure; the other is to choose the low-gloss thermoplastic resin. However, in some cases, the method of reducing the gloss by simply changing texture of the interior structure still cannot meet the requirements of gloss (a resin having high gloss characteristics, e.g. PC, and its alloys), and it brings certain restrictions to design freedom of the interior surface. In addition, once the leather structure of interior parts is lost due to the scratch resistance of the resin, there will be a significant difference in gloss, thereby causing visual color difference and resulting in failure. Therefore, the low gloss of the thermoplastic resin is very important; it can reduce the dependence on the surface of the internal mold to a certain extent, thereby broadening the application scope of resin and prolonging the service life thereof.

It is well known that the gloss of ABS resin is mainly determined by the particle size of butadiene rubber; the greater the particle size of rubber is, the lower the gloss is. The rubber particle size of emulsion polymerization ABS resin is usually within 0.5 μm, so the surface gloss is high; the rubber particle size of bulk polymerization ABS resin is usually greater than 0.6 μm, so the surface gloss is low. However, the size of rubber particles will affect the mechanical properties of ABS resin; especially, the influence on the rigidity is particularly significant. It is generally believed that the Young's modulus of the SAN matrix resin is inversely proportional to the volume fraction of PB rubber. In the bulk polymerization ABS resin, the higher the SAN content is, the greater the rubber particle seize is and the greater the volume fraction of the rubber is; which will greatly reduce the tensile strength and tensile modulus of ABS resin. Therefore, in case of the same rubber content, the rigidity of bulk polymerization ABS will be lower than that of emulsion polymerization ABS; the rigidity of HIPS resin with the rubber particle size of greater than 2 μm is lower. In addition, the greater the rubber particle size is, the greater the deformation capacity is; therefore, in the injection molding, processing and coloring processes, local white, flow marks, welding lines and other defects easily occur.

Generally, there are three main modification methods to reduce the gloss of resin surface. First is the addition of incompatible substances, such as incompatible resin and mineral fillers. For example, Patent WO 2010/049320 proposes the reduction of resin gloss by using a derivative added with melamine; Patent CN 1128776A proposes the reduction of alloy gloss by adding nitrile rubber in PC/ABS alloy. But incompatible substances usually cause deterioration of the mechanical properties of the resin itself. Second is the addition of a reactive resin. For example, Patents CN 101851430, CN 101787192, U.S. Pat. No. 4,902,743, U.S. Pat. Nos. 4,596,851 and 4,742,104 disclose the addition of a resin containing glycidyl methacrylate (GMA) functional group in PC and its alloy to reduce the gloss. Third is the addition of a crosslinked resin; U.S. Pat. No. 6,395,828 discloses a method for reducing the gloss of ASA resin by crosslinking epoxy functional groups and amine functional groups. The crosslinking reaction can also occur between the epoxy functional group and the maleic anhydride functional group. For example, Patent CN 102617973 adopts the above-mentioned scheme to achieve the purpose of enhancing the melt strength by crosslinking. However, the reaction efficiency is relatively low; it is better to catalyze the crosslinking reaction in the shorter blending extrusion time. Moreover, the crosslinking reaction often causes obvious melt swell of the melt bars at the die mouth of the extruder, which makes it difficult to realize subsequent palletizing and dispersion in the resin. Patent CN 101724129 discloses a method of reducing the gloss of matrix resin by using alkyl(meth)acrylate with a three-dimensional network structure. The most widely used one is the commercialized and gelatinized SAN resin which is developed by General Electric Company. Patents CN 102108176, U.S. Pat. No. 5,580, 924 and U.S. Pat. No. 097,341 disclose that the gelled SAN resin can significantly reduce the surface gloss of the matrix resin. However, when the gelatinized SAN resin is used as a matting agent, due to its partial crosslinking, the product surface is too rough and has uneven gloss; especially when the leather structure of the product surface is a delicate design, the problem is particularly evident.

SUMMARY OF THE PRESENT INVENTION

In view of the defects in the prior art, an object of the present invention is to provide a low-gloss heat-resistant ABS resin composition and its preparation method, to solve the problems in the prior art during the preparation of low-gloss ABS resin, such as the deterioration in mechanical properties, not low enough gloss, uneven distribution and surface roughness; the low-gloss heat-resistant ABS resin composition in the present invention is a heat-resistant ABS resin composition with soft surface, ultra-low gloss and excellent performance, which can be used for automotive interior parts.

The object of the present invention is realized by means of the following technical solution:

The present invention provides a low-gloss heat-resistant ABS resin composition, comprising following components and parts by weight of:

| acrylonitrile-butadiene-styrene (ABS) resin | 100, |
|---|---|
| heat-resistant agent | 5-30, |
| matte masterbatch D | 1-5, |
| light stabilizer | 0.2-1.0, and |
| additives | 0.5-2.0. |

Preferably, the ABS resin has a weight-average molecular weight of 80,000-150,000.

Preferably, a weight content of butadiene rubber in the ABS resin is 10-17%.

Preferably, a number-average particle diameter of the butadiene rubber is 0.6-4.0 μm; when the particle diameter thereof is less than 0.6 μm, a gloss will be improved obviously; when the particle diameter thereof is greater than 4.0 μm, a rigidity of the ABS resin will be greatly reduced.

Preferably, the heat-resistant agent is N-phenylmaleimide-styrene-maleic anhydride copolymer or α-methylstyrene-acrylonitrile copolymer.

Preferably, the matte masterbatch D comprises processing aids and components by following weight percentages of:

| resin A containing maleic anhydride (MAH) functional group | 15-40%, |
|---|---|
| resin B containing glycidyl methacrylate (GMA) functional group | 20-50%, |
| polyolefin-alkyl acrylate copolymer C | 20-60%, |
| fumed silica | 1-5%, and |
| hydrated zinc borate | 0.5-3%. |

Preferably, the processing aids comprise antioxidant and lubricant; the antioxidant is antioxidant B900, with a content of 0.3 phr; the lubricant is EBS, with a content of 1.0 phr.

Preferably, the resin A containing maleic anhydride (MAH) functional group is styrene-maleic anhydride, acrylonitrile-styrene-maleic anhydride copolymer, acrylonitrile-butadiene-styrene-maleic anhydride copolymer, styrene-butadiene-styrene-maleic anhydride copolymer, styrene-(ethylene-butylene)-styrene-maleic anhydride copolymer, ethylene-maleic anhydride copolymer, butylenes-maleic anhydride copolymer, ethylene-butylene-maleic anhydride copolymer or ethylene-octene-maleic anhydride copolymer.

Preferably, the resin B containing glycidyl methacrylate (GMA) functional group is acrylonitrile-styrene-glycidyl methacrylate copolymer, acrylonitrile-butadiene-styrene-glycidyl methacrylate copolymer, ethylene-methyl methacrylate-glycidyl methacrylate copolymer, ethylene-methyl ethylacrylate-glycidyl methacrylate copolymer, ethylene-ethyl methacrylate-glycidyl methacrylate copolymer, ethylene-butyl methacrylate-glycidyl methacrylate copolymer, ethylene-ethyl ethylacrylate-glycidyl methacrylate copolymer or ethylene-butyl ethylacrylate-glycidyl methacrylate copolymer.

Preferably, the polyolefin-alkyl acrylate copolymer C is ethylene-methyl methacrylate copolymer, ethylene-butyl methacrylate copolymer, ethylene-ethyl methacrylate copolymer, ethylene-ethyl ethylacrylate copolymer, ethylene-butyl ethylacrylate copolymer or ethylene-isooctyl methacrylate copolymer.

Preferably, the hydrated zinc borate has a particle size of 1-5 μm.

More preferably, the hydrated zinc borate is a zinc borate containing 3.5 crystal water ($2ZnO \cdot 3B_2O_3 \cdot 3.5H_2O$) or 7 crystal water ($2ZnO \cdot 3B_2O_3 \cdot 7H_2O$).

Preferably, the matte masterbatch D is obtained from a preparation method comprising following steps of:

(S1) preparing materials according to following components and contents of:

| resin A containing maleic anhydride (MAH) functional group | 15-40%, |
|---|---|
| resin B containing glycidyl methacrylate (GMA) functional group | 20-50%, |
| polyolefin-alkyl acrylate copolymer C | 20-60%, |
| fumed silica | 1-5%, and |
| hydrated zinc borate | 0.5-3%; and |

(S2) fully and uniformly mixing the resin A containing maleic anhydride (MAH) functional group, the resin B containing glycidyl methacrylate (GMA) functional group, the polyolefin-alkyl acrylate copolymer C, the fumed silica, the hydrated zinc borate and the processing aids, and then extruding and granulating through a twin-screw extruder, and finally obtaining the matte masterbatch D.

Preferably, the twin-screw extruder has a screw length-diameter ratio of 36-44; the twin-screw extruder comprises a temperature controlling device and a vacuum device.

Preferably, an extrusion temperature of the twin-screw extruder is 200-260° C., and a screw speed thereof is 200-500 rpm.

Preferably, the light stabilizer is at least one member selected from a group consisting of salicylate, benzophenone UV absorbent, triazine UV absorbent, benzotriazole UV absorbent and hindered amine radical scavenger; the benzophenone UV absorbent, e.g., Cyasorb UV-53; the triazine UV absorbent, e.g., Cyasorb UV-1164; the benzotriazole UV absorbent, such as Tinuvin 326 and Cyasorb UV-5411; the hindered amine radical scavenger, such as Tinuvin 770 and Cyasorb UV-3346.

Preferably, the additives are at least one member selected from a group consisting of silane coupling agent, titanate coupling agent, hindered phenolic antioxidant, phosphite antioxidant, ethylene bisstearamide, pentaerythritol stearate, magnesium stearate and calcium stearate.

On the other hand, the present invention relates to a preparation method of low-gloss heat-resistant ABS resin composition, wherein the preparation method comprises following steps of:

(S1) preparing materials according to following components and parts by weight of: 100 parts of ABS resin, 5-30 parts of heat-resistant agent, 1-5 parts of matte masterbatch D, 0.2-1.0 parts of light stabilizer and 0.5-2.0 parts of additives; and (S2) stirring and fully mixing the ABS resin, the heat-resistant agent, the matte masterbatch D, the light stabilizer and the additives in a high-speed mixer, and then extruding and granulating through a twin-screw extruder, and finally obtaining the low-gloss heat-resistant ABS resin composition.

Preferably, the twin-screw extruder has a screw length-diameter ratio of 36-44; the twin-screw extruder comprises a temperature controlling device and a vacuum device.

Preferably, an extrusion temperature of the twin-screw extruder is 190-240° C., and a screw speed thereof is 200-500 rpm.

Compared with the prior art, the present invention has the following beneficial effects:

1. By adopting the crosslinking reaction between the resin containing glycidyl methacrylate functional group and polyolefin-alkyl acrylate copolymer, the composition of the present invention innovatively uses the hydrated zinc borate having a thermal decomposition temperature of higher than 250° C. as the reaction catalyst, so that the use of zinc acetate hydrate (Zn(AC)$_2$.2H$_2$O) and copper sulfate hydrate (CuSO$_4$.5H$_2$O) having a thermal decomposition temperature of lower than 100° C. is avoided in the prior art, thereby greatly improving the catalytic crosslinking reaction.

2. The composition of the present invention adopts a small amount of fumed SiO$_2$, so as to ease the extrusion swelling of resin melt and further promote the gloss reduction, thereby preparing a matte masterbatch with uniform particle size; the matte masterbatch is added to the heat-resistant ABS resin, to obtain an ABS resin composition with soft surface, ultra-low gloss and excellent performance, which can be used for automotive interior parts.

DETAILED DESCRIPTION OF THE PREFERRED EMBODIMENT

The present invention is described in detail as follows with reference to specific embodiments. The following embodiments will be conductive to further understanding of the present invention for those skilled in the art, and not in any way limit the present invention. It should be noted that several variants and improvements can be made without departing from concept of the present invention for ordinary persons skilled in the art. All these fall within the protection scope of the present invention.

First Embodiment

The first embodiment relates to a low-gloss heat-resistant ABS (acrylonitrile-butadiene-styrene) resin composition and its preparation method, as described below.

1. Preparation of matte masterbatch D (components and weight contents are shown in Table 1):

Stirring and fully mixing resin A containing maleic anhydride (MAH) functional group, resin B containing glycidyl methacrylate (GMA) functional group, polyolefin-alkyl acrylate copolymer C, fumed silica, hydrated zinc borate, as well as antioxidant B900 0.3 phr and lubricant EBS 1.0 phr in a high-speed mixer to obtain a mixture, feeding the mixture into a twin-screw extruder through a metering device; melting and compounding the mixture under conveying, shearing and mixing of screws, and then extruding, pulling, cooling and granulating, and finally obtaining matte masterbatches D1-D8 with uniform particle size.

A length-diameter ratio of the screws of the twin-screw extruder is 40; a temperature at a front section of the screws is 200-230° C.; a temperature at a middle section thereof is 240-260° C.; a head extrusion temperature is 250° C.; and a screw speed is 300 rpm.

TABLE 1

| Preparation of Matte Masterbatch D | | | | | | | | |
|---|---|---|---|---|---|---|---|---|
| Component/g | D1 | D2 | D3 | D4 | D5 | D6 | D7 | D8 |
| A1 | 15 | 30 |  |  | 20 | 20 | 30 | 30 |
| A2 |  |  | 40 |  |  |  |  |  |
| B1 | 30 | 30 | 26 |  |  | 30 | 30 |  |
| B2 |  |  |  | 50 | 50 |  |  |  |
| C1 | 53.5 | 36 | 30 | 23 | 23 | 39 | 40 | 36 |
| SiO$_2$ | 1 | 3 | 2 | 5 | 5 |  |  | 3 |
| 2ZnO·3B$_2$O$_3$·7H$_2$O | 0.5 | 1 | 2 | 2 |  | 1 |  | 1 |
| Zn(AC)$_2$·2H$_2$O |  |  |  |  | 2 |  |  |  |
| Nylon 6 |  |  |  |  |  |  |  | 30 |
| Polypropylene-methacrylate copolymer (PP-g-AA) |  |  |  |  |  |  |  | 30 |
| Appearance of matte masterbatch | Even | Even | Even | Even | Even | Uneven | Uneven | Even |

In Table 1, the resin A1 containing maleic anhydride (MAH) functional group: styrene-maleic anhydride copolymer (SMA), Polyscope SZ23110;

The resin A2 containing maleic anhydride (MAH) functional group: ethylene-octene-maleic anhydride copolymer (POE-g-MAH), Nantong Rizhisheng 5805SL;

The resin B1 containing glycidyl methacrylate (GMA) functional group: styrene-acrylonitrile-glycidyl methacrylate copolymer (SAN-g-GMA), Nantong Rizhisheng SAG002;

The resin B2 containing glycidyl methacrylate (GMA) functional group: ethylene-methyl methacrylate-glycidyl methacrylate copolymer (EMA-g-GMA), Arkema Lotader AX8900;

Polyolefin-alkyl acrylate copolymer C1: ethylene-methyl methacrylate (EMA): Arkema Lotader 29MA03;

Fumed SiO$_2$: Degussa Evonik TS100.

2. Preparation of low-gloss heat-resistant ABS resin composition (components and weight contents are shown in Table 3):

Stirring and fully mixing ABS resin, heat-resistant agent, matte masterbatch D, light stabilizer and other additives in a high-speed mixer to obtain a mixture, feeding the mixture into a twin-screw extruder through a metering device; melting and compounding the mixture under conveying, shearing and mixing of screws, and then extruding, pulling, cooling and granulating, and finally obtaining a low-gloss resin composition which can be used for automotive interior parts;

wherein: a length-diameter ratio of the screws of the twin-screw extruder is 40; a temperature at a front section of the screws is 190-210° C.; a temperature at a middle section thereof is 220-240° C.; a head extrusion temperature is 235° C.; and a screw speed is 300 rpm.

Second, Third, Fourth, Fifth and Sixth Embodiments

The second, third, fourth, fifth and sixth embodiments relate to the preparation of low-gloss heat-resistant ABS resin composition; the preparation method is the same as that mentioned in the first embodiment. The components and contents in part by weight of the low-gloss heat-resistant ABS resin composition corresponding to the second, third, fourth, fifth and sixth embodiments are shown in Table 3.

First, Second, Third, Fourth, Fifth and Sixth Comparative Examples

The first, second, third, fourth, fifth and sixth comparative examples relate to the preparation of low-gloss heat-resistant ABS resin composition; the preparation method is the same as that mentioned in the first embodiment. The components and contents in part by weight of the ABS resin composition corresponding to the first, second, third, fourth, fifth and sixth comparative examples are shown in Table 3.

The mechanical properties of the low-gloss heat-resistant ABS resin composition prepared in the embodiments and comparative examples are tested according to the ASTM standard (see Table 2). The gloss test is carried out by using the ASTM D2457 method and Multigloss 268 Glossmeter of Konica Minolta; the test angle on the injection molding color plate is 60°.

TABLE 2

| Physical properties | Test method |
|---|---|
| Tensile strength (50 mm/min) | ASTM D638 |
| Bending strength (3 mm/min) | ASTM D790 |
| Bending modulus (3 mm/min) | ASTM D790 |
| IZOD notched impact strength (3.2 mm) | ASTM D256 |
| Vicat (5 kg, 50° C./h) | ASTM D1525 |

TABLE 3

The Components and Parts by Weight of the ABS Resin Composition in the first, second, third, fourth, fifth and sixth embodiments and the first, second, third, fourth, fifth and sixth comparative examples

| Component | | Embodiment | | | | | | Comparative example | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| ABS resin | ABS1 | 100 | | | | | | | | | | | |
| | ABS2 | | 100 | | | | | | | | 100 | 100 | 100 |
| | ABS3 | | | 100 | | | 100 | | | 100 | | | |
| | ABS4 | | | | 100 | | | | | | 100 | | |
| | ABS5 | | | | | 100 | | | | | | | |
| | ABS6 | | | | | | | 100 | | | | | |
| | ABS7 | | | | | | | | 100 | | | | |
| Heat-resistant agent | α-SAN | 30 | 15 | | | | 20 | | | 15 | 15 | 15 | 15 |
| | N-PMI-St-MAH | | | 5 | 10 | | 10 | 10 | 10 | | | | |
| Matte masterbatch D | D1 | 1 | | | | | | | | | | | |
| | D2 | | 3 | | | | | | | | | | |
| | D3 | | | 5 | | | 3 | | | | | | |
| | D4 | | | | 3 | 2 | | | | | | | |
| | D5 | | | | | | | | | 3 | | | |
| | D6 | | | | | | | | | | 3 | | |
| | D7 | | | | | | | | | | | 3 | |
| | D8 | | | | | | | | | | | | 3 |
| Light stabilizer | Tinuvin 770 (bis (2,2,6,6-tetramethyl-4-piperidyl) sebacate) | 0.3 | 0.3 | 0.3 | 0.3 | 0.3 | 0.3 | 0.3 | 0.3 | 0.3 | 0.3 | 0.3 | 0.3 |
| Miscellaneous | Irganox B900 | 0.3 | 0.3 | 0.3 | 0.3 | 0.3 | 0.3 | 0.3 | 0.3 | 0.3 | 0.3 | 0.3 | 0.3 |
| Auxiliaries | EBS | 0.5 | 0.5 | 0.5 | 0.5 | 0.5 | 0.5 | 0.5 | 0.5 | 0.5 | 0.5 | 0.5 | 0.5 |
| ASTM | | | | | | | | | | | | | |
| Tensile strength/Mpa | | 47 | 46 | 45 | 43 | 46 | 45 | 49 | 38 | 42.5 | 46 | 46 | 46 |
| Bending strength/Mpa | | 68 | 66 | 65 | 62 | 65 | 65 | 70 | 58 | 63 | 65 | 66 | 66 |
| Bending modulus/Mpa | | 2420 | 2315 | 2300 | 2130 | 2350 | 2250 | 2550 | 1950 | 2215 | 2300 | 2320 | 2325 |
| Impact strength/J/m | | 325 | 275 | 285 | 185 | 256 | 260 | 280 | 315 | 190 | 268 | 280 | 278 |
| Vicat softening point/° C. | | 102 | 99 | 99.5 | 102.8 | 100 | 103 | 104 | 103 | 99.6 | 99.3 | 99.5 | 99.6 |
| Gloss/60° | | 6.2 | 4.3 | 3.1 | 3.5 | 3.8 | 3.6 | 20.6 | 8.0 | 9.6 | 7.2 | 9.5 | 10.6 |

The components and characteristics involved in the above-mentioned embodiments and comparative examples are as follows:

ABS resin ABS1: a content of butadiene rubber is 17%; a particle size is 0.6 μm; a weight-average molecular weight is 80,000;

ABS resin ABS2: the content of butadiene rubber is 15%; the particle size is 1.0 μm; the weight-average molecular weight is 100,000;

ABS resin ABS3: the content of butadiene rubber is 15%; the particle size is 1.5 μm; the weight-average molecular weight is 120,000;

ABS resin ABS4: the content of butadiene rubber is 10%; the particle size is 2.5 μm; the weight-average molecular weight is 140,000;

ABS resin ABS5: the content of butadiene rubber is 13%; the particle size is 0.8 μm; the weight-average molecular weight is 150,000;

ABS resin ABS6: the content of butadiene rubber is 15%; the particle size is 0.4 μm; the weight-average molecular weight is 120,000;

ABS resin ABS7: the content of butadiene rubber is 13%; the particle size is 4.5 μm; the weight-average molecular weight is 120,000;

Heat-resistant agent: α-methylstyrene-acrylonitrile copolymer (α-SAN), BASF KR2556;

Heat-resistant agent: N-phenylmaleimide-styrene-maleic anhydride copolymer (N-PMI-St-MAH) is electrochemical MSNH.

According to the preparation of matte masterbatch D in Table 1 and the embodiments and comparative examples in Table 3, the matte masterbatch with uniform appearance and low-gloss heat-resistant ABS resin composition can be prepared by using the crosslinking reaction between the resin containing glycidyl methacrylate (GMA) functional group and polyolefin-alkyl acrylate copolymer under catalysis of hydrated zinc borate; the matte effect is distributed uniformly. According to the second, third, fourth, fifth and sixth embodiments, the present invention has high efficiency for reducing the gloss of ABS resin, can maintain the excellent mechanical properties and meet the application of automotive interior parts. According to the second comparative example, the mechanical properties of ABS resin with large rubber particle size will be greatly reduced, which is not conducive to the actual use of the product. In the third comparative example, when zinc acetate hydrate is used as a crosslinking catalyst, water loss may occur due to the ultra-low thermal decomposition temperature, thereby reducing the catalytic cross-linking effect, so that the efficiency of reducing the gloss of ABS resin is greatly reduced. In the fourth comparative example and the fifth comparative example, there is no fumed $SiO_2$, the overall gloss of the heat-resistant ABS resin will be improved, and the gloss uniformity will be deteriorated. It can be seen in the fifth comparative example that the effect of hydrated zinc borate on the promotion of gloss reduction is significant. In the sixth comparative example, the effect of reducing the gloss by using the crosslinking reaction between the amide group of PA6 and methacrylic acid is relatively limited.

It should be noted that the light stabilizer is not limited to the above-mentioned Tinuvin 770 (bis (2,2,6,6-tetramethyl-4-piperidyl) sebacate); the benzophenone UV absorbent, e.g., Cyasorb UV-53, the triazine UV absorbent, e.g., Cyasorb UV-1164, the benzotriazole UV absorbent, such as Tinuvin 326 and Cyasorb UV-5411, the hindered amine radical scavenger, e.g., Cyasorb UV-3346, can be used as a light stabilizer to achieve the present invention.

Specific embodiments of the present invention are described above. It shall be understood that the present invention is not limited to the above-mentioned specific embodiments, and those skilled in the art can make different variants and modifications within the scope of the claims, and it shall not affect the substance of the present invention.

What is claimed is:

1. A low-gloss heat-resistant acrylonitrile-butadiene-styrene (ABS) resin composition, comprising the following components in part by weight of:

| | |
|---|---|
| acrylonitrile-butadiene-styrene resin | 100, |
| heat-resistant agent | 5-30, |
| matte masterbatch | 1-5, |
| light stabilizer | 0.2-1.0, and |
| additives | 0.5-2.0, wherein: | the matte masterbatch comprises processing aids and components by following weight percentages based on the total weight of the matte masterbatch of:

| | |
|---|---|
| resin containing maleic anhydride functional group | 15-40%, |
| resin containing glycidyl methacrylate functional group | 20-50%, |
| polyolefin-alkyl acrylate copolymer | 20-60%, |
| fumed silica | 1-5%, and |
| hydrated zinc borate | 0.5-3%. |

2. The low-gloss heat-resistant ABS resin composition according to claim 1, wherein the ABS resin has a weight-average molecular weight of 80,000 to 150,000; a weight content of butadiene rubber in the ABS resin is 10-17%.

3. The low-gloss heat-resistant ABS resin composition according to claim 1, wherein the heat-resistant agent is N-phenylmaleimide-styrene-maleic anhydride copolymer or α-methylstyrene-acrylonitrile copolymer.

4. The low-gloss heat-resistant ABS resin composition according to claim 1, wherein the matte masterbatch is obtained from a preparation method comprising the following steps of:

(S1) preparing materials according to the following components and weight percentages based on the total weight of the matte masterbatch of: of:

| | |
|---|---|
| the resin containing maleic anhydride functional group | 15-40%, |
| the resin containing glycidyl methacrylate functional group | 20-50%, |
| the polyolefin-alkyl acrylate copolymer | 20-60%, |
| the fumed silica | 1-5%, and |
| the hydrated zinc borate | 0.5-3%; and |

(S2) fully and uniformly mixing the resin containing maleic anhydride functional group, the resin containing glycidyl methacrylate functional group, the polyolefin-alkyl acrylate copolymer, the fumed silica, the hydrated zinc borate and the processing aids, and then extruding and granulating through a twin-screw extruder, and finally obtaining the matte masterbatch.

5. The low-gloss heat-resistant ABS resin composition according to claim 1, wherein the light stabilizer is at least one member selected from a group consisting of salicylate, benzophenone UV absorbent, triazine UV absorbent, benzotriazole UV absorbent and hindered amine radical scavenger.

6. The low-gloss heat-resistant ABS resin composition according to claim 1, wherein the additives are at least one member selected from a group consisting of silane coupling agent, titanate coupling agent, hindered phenolic antioxidant, phosphite antioxidant, ethylene bisstearamide, pentaerythritol stearate, magnesium stearate and calcium stearate.

7. A preparation method of the low-gloss heat-resistant ABS resin composition according to claim 1, comprising steps of:

(S1) preparing materials according to the following components and parts by weight: 100 parts of the ABS resin, 5-30 parts of the heat-resistant agent, 1-5 parts of the matte masterbatch, 0.2-1.0 parts of the light stabilizer and 0.5-2.0 parts of the additives; and (S2) stirring and mixing the ABS resin, the heat-resistant agent, the matte masterbatch, the light stabilizer and the additives in a high-speed mixer, and then extruding and granulating through a twin-screw extruder, and finally obtaining the low-gloss heat-resistant ABS resin composition.

8. The preparation method of the low-gloss heat-resistant ABS resin composition according to claim 7, wherein in the step of (S2), the twin-screw extruder has a screw length-diameter ratio of 36-44; the twin-screw extruder comprises a temperature controlling device and a vacuum device.

9. The preparation method of the low-gloss heat-resistant ABS resin composition according to claim 7, wherein in the step of (S2), an extrusion temperature of the twin-screw extruder is 190-240° C., and a screw speed thereof is 200-500 rpm.

* * * * *